United States Patent [19]

Tsai

[11] Patent Number: 5,403,023
[45] Date of Patent: Apr. 4, 1995

[54] LUGGAGE TRUCK

[76] Inventor: Cheng-Hsien Tsai, No. 103, Da-Ming 1st Rd., Tien-Tzu Hsiang, Taichung Hsien, Taiwan, Prov. of China

[21] Appl. No.: 282,540

[22] Filed: Jul. 29, 1994

[51] Int. Cl.[6] ............................................. B62B 3/02
[52] U.S. Cl. ..................................... 280/42; 280/651;
            280/47.34; 280/79.11; 280/47.371
[58] Field of Search ............... 280/37, 42, 35, 47.34,
        280/47.371, 64, 79.11, 639, 646, 651, 655, 655.1;
                                        180/906; 190/18 A

[56] References Cited

U.S. PATENT DOCUMENTS

| | | | |
|---|---|---|---|
| 3,329,442 | 7/1967 | Di Vietri | 280/35 |
| 3,842,953 | 10/1974 | Royet | 190/18 A |
| 3,960,252 | 6/1976 | Cassimally | 280/37 X |
| 4,060,252 | 11/1977 | Mowery | 280/79.11 |
| 4,087,102 | 5/1978 | Sprague | 280/37 |
| 4,273,222 | 6/1981 | Cassimally et al. | 280/37 X |
| 4,761,012 | 8/1988 | Dames et al. | 280/646 X |
| 4,771,871 | 9/1988 | Lambracht | 280/37 X |

FOREIGN PATENT DOCUMENTS 7800696 7/1979 Netherlands ..................... 280/42

*Primary Examiner*—Brian L. Johnson
*Attorney, Agent, or Firm*—Jacobson, Price, Holman & Stern

[57] ABSTRACT

A luggage truck, including a base equipped with wheels in the corners at the bottom thereof and having a track and a slide moved along the track, a pull arm extended upward from the front end of the base, a handle coupled to the pull arm, an extension member connected between the handle and the slide, and two wheel holders pivotally mounted on the base at the bottom and bilaterally engaged with the slide to hold a respective wheel, wherein when the extension member is pulled out of the pull arm after the handle has been released from the pull arm, the slide is pulled forward causing the movable wheel holders to turn outwards and to extend out of two opposite sides of the base; when the extension member is pushed back inside the pull arm, the slide is moved back causing the movable wheel holders to turn inward and to be received inside the base at the bottom.

7 Claims, 4 Drawing Sheets

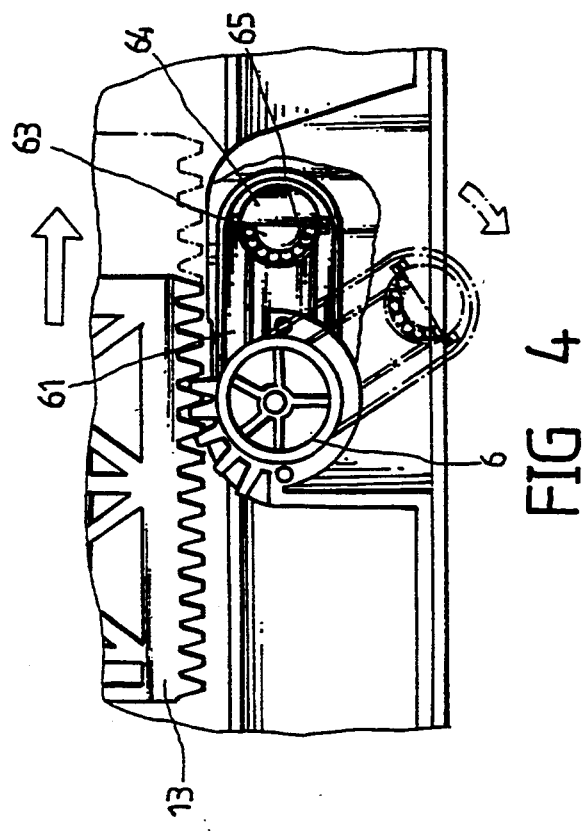

LUGGAGE TRUCK

BACKGROUND OF THE INVENTION

The present invention relates a luggage truck which comprises a base equipped with wheels at the bottom, a slide made to slide in a track on the base, a pull arm at one end of the base thereof, a handle coupled to the Pull arm and having a flexible extension member at the bottom connected to the slide, and two movable wheel holders meshed with the slide, wherein when the extension member is pulled out of the pull arm by the handle, the handle can be turned in either direction to drag the truck, and the slide is moved forwards to turn the movable wheel holders bilaterally outwards causing the movable wheel holders to extend out of the opposite sides of the base.

Various hand trucks are known and intensively used for carrying luggage. These hand trucks are commonly made of metal and not collapsible. There is also know such a hand truck having a retractable handle. The retractable handle can be collapsed to reduce the storage space when the hand truck is not in use. However, because the retractable handle is not flexible, it cannot be bent when the person who pulls the hand truck turns it to another direction. Therefore, the person who pulls the hand truck must be very careful when makes a turn. Furthermore, because the wheels of a hand truck are commonly mounted in the four corners of the base, the hand truck becomes unstable when making a turn.

SUMMARY OF THE INVENTION

The present invention has been accomplished to provide a luggage truck which eliminates the aforesaid drawbacks.

According to one aspect of the present invention, the luggage truck comprises a base equipped with wheels in the four corners thereof at the bottom and having a track longitudinally disposed in the middle, a slide moved back and forth along the track, a pull arm extend upward from the front end of the base at the top and is covered with a decorative cover board, the pull arm having an opening at the top and a locating hole at one side near the top, a handle extending out of the top opening of the pull arm and having a bolt inserted into the locating hole on the pull arm, an extension member received inside the pull arm and connected between the handle and the slide, two movable wheel holders pivotally mounted on the base at the bottom and bilaterally meshed with the slide to hold a respective wheel at an outer side, a lock connected between the extension member and the slide for locking the extension member in an extended-out position outside the top opening of the pull arm, and wherein when the extension member is moved to the extended-out position by the handle after the bolt of the handle has been pushed inwards from the locating hole on the pull arm, the slide is pulled forward causing the movable wheel holders to turn bilaterally outward and to extend out of the opposite sides of the base. When the movable wheel holders extend out from the two opposite sides of the base, the luggage truck is stably supported on the ground for carrying luggage.

According to another aspect of the present invention, the lock is connected between the extension member and the slide such that it is moved into the locking position to lock the extension member in the extended-out position when the extension member is pulled out of the top opening of the pull arm by the handle.

BRIEF DESCRIPTION OF THE DRAWINGS

FIG. 4 is a partial view taken on FIG. 2, showing the movable wheel holders turned outward.

DETAILED DESCRIPTION OF THE PREFERRED EMBODIMENT

Figure 1:
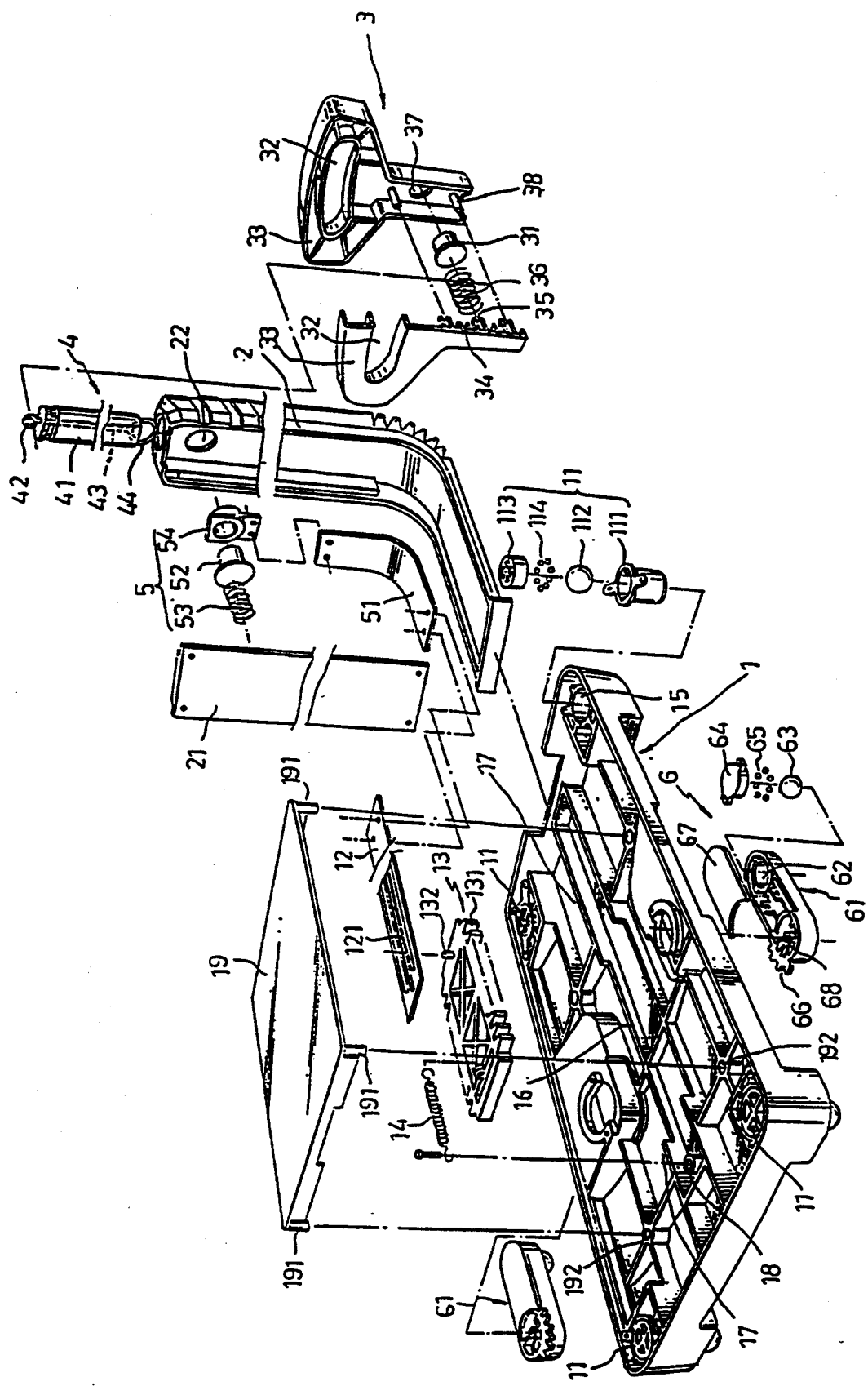
FIG. 1 is an exploded view of a luggage truck according to the preferred embodiment of the present invention.

Referring to the annexed drawings in detail, a luggage truck in accordance with the present invention is generally comprised of a base 1, a pull arm 2, a handle 3, an extension member 4, a lock 5, and a pair of movable wheel holders 6.

Referring to FIG. 1, the base 1 comprises four wheel assemblies 11 in the four corners at the bottom thereof. The pull arm 2 is shaped with a bend extending from the top of the base 1 and covered with a decorative cover board 21. The handle 3 is inserted into a hole (not show) on the top of the pull arm 2, having a bolt 31 extended out of a side hole 37 thereof and inserted into a side hole 22 on the pull arm 2. Therefore, the handle 3 is pivotally connected to the pull arm 2. The extension member 4 has one end fixedly fastened to the handle 3, and an opposite end connected to the lock 5. The lock 5 comprises a connecting frame 51 fixedly connected to a plate 12 on the base 1. The plate 12 is fixedly mounted on a slide 13. The slide 13 has two racks 131 longitudinally disposed at two opposite sides respectively engaged with the movable wheel holders 6. A cover plate 19 is fastened to the base 1 at the top and covers over the movable wheel holders 6, having downward mounting rods 191 respectively fitting into respective mounting holes 192 on the base 1.

The wheel assembly 11 comprises a socket 111 mounted within a hole 15 in either corner of the base 1, a bearing block 113 mounted within the socket 111 at the top to hold a plurality of steel balls 114 around a circle, and a spherical wheel 112 turned within the steel balls 114 and partially extended out of a bottom opening (not shown) on the socket The base 1 further comprises two parallel rails 16 longitudinally disposed in the middle, each having two raised portions 17 at two opposite ends. The slide 13 is made to slide on the parallel rails 16 between the raised portions 17. The slide 13 is fixedly mounted with a spring 14. The spring 14 has an opposite end fastened to a stub rod 18 on the base 1.

The aforesaid plate 12 is attached to the slide 13 at the top, having slots 121 fastened to a peg 132 on the slide 13 by screws.

The handle 3 comprises two symmetrical handle shells 33 joined together, defining a hand hole 32 through both handle shells 33. The aforesaid side hole 37 is made on one handle shell. The other handle shell has a recessed hole 34 corresponding to the side hole 37, and a stub rod 35 disposed in the recessed hole 34. A spring 36 is mounted on the stub rod 35 to support the aforesaid bolt 31 causing it to partially extend out of the side hole 37.

The extension member 4 comprises a barrel 41 molded from flexible plastics, a first mounting ring 42 fastened to a stub rod 38 inside the handle 3, a second mounting ring 44 fastened to the lock 5, and a steel cable 43 connected between the first and second mounting rings 42 and 44.

The lock 5 further comprises a bolt 52, to which the steel cable 43 is connected, a spring 53 stopped between the bolt 52 and the decorative cover board 21, a socket 54 fixedly fastened to the connecting frame 51 to hold the front end of the bolt 52.

The movable wheel holder 6 comprises a casing 61 having a hole 62 at one end, a cap 64 mounted on the hole 62, a spherical wheel 63 revolvably retained in the cap 64 by steel balls 65 and partially extended out of the hole 62 on the casing 61, a cover shell 67 covered on the casing 61 over the cap 64, a sector gear 66 fixedly fastened to the casing 61 and meshed with either rack 131 and having mounting rod 68 at the angle fastened to the base 1 through a screw joint.

Figure 2:
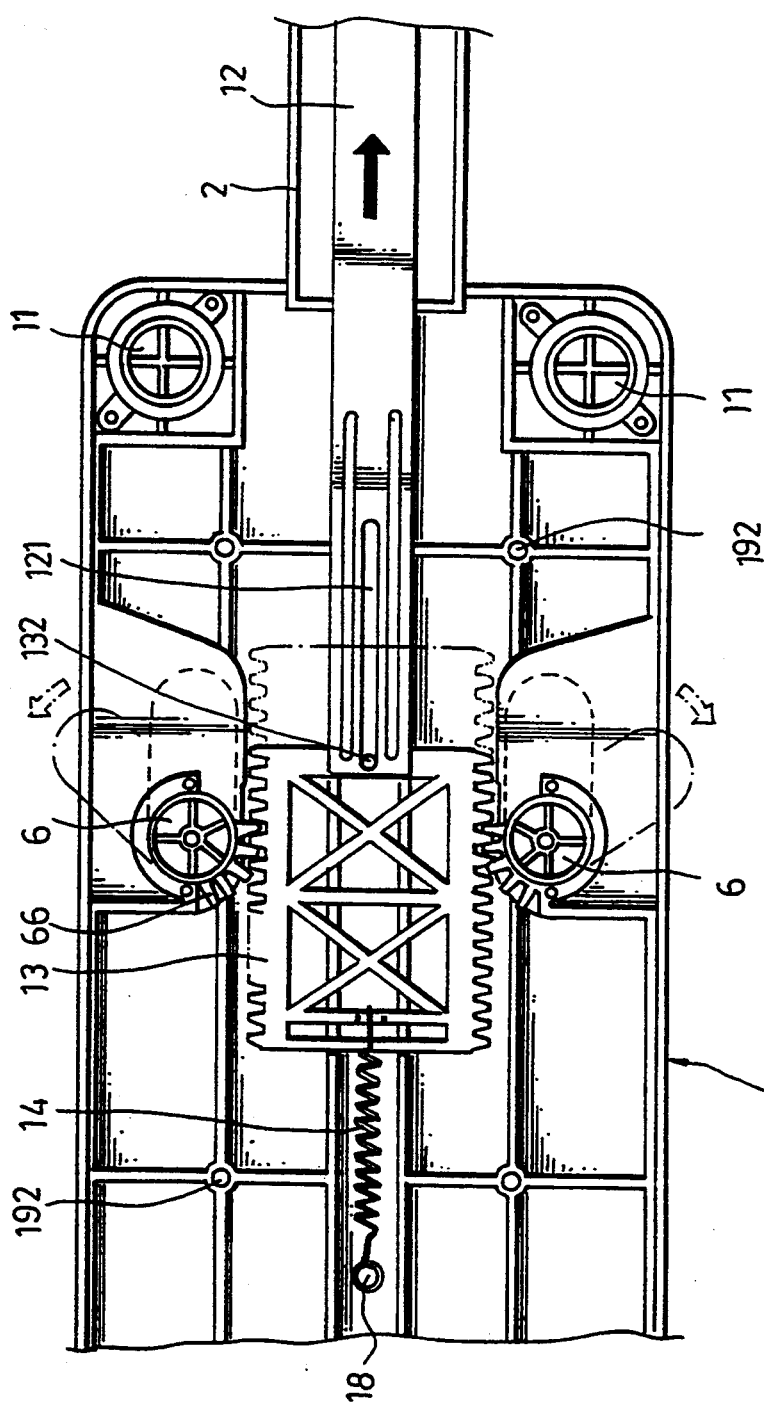
FIG. 2 is a plain view of the luggage truck thereof, showing the slide pulled forward and the movable wheel holders turned outwards.

Referring to FIGS. 1 and 2 again, when the bolt 31 is pushed backwards from the side hole 22 on the pull arm 2, the extension member 4 can then be pulled out of the pull arm 2 by the handle 3. Because the barrel 41 of the extension member 4 is molded from flexible plastics, it can easily be bent for allowing the handle 3 to fold dragged in any direction. When the extension member 4 is pulled out of the pull arm 2, the connecting frame 51 of the lock 5 is simultaneously pulled upward by the extension member 4 causing the plate 12 and the slide 13 move forward along the parallel rails 16. When the extension member 4 is pulled out of the pull arm 2, the socket 54 of the lock 5 is stopped at the bottom of the top wall of the pull arm 2, and the bolt 52 is forced back into the side hole 22 by the spring 53 to stop the connecting frame 51 from moving backwards.

Figure 3:
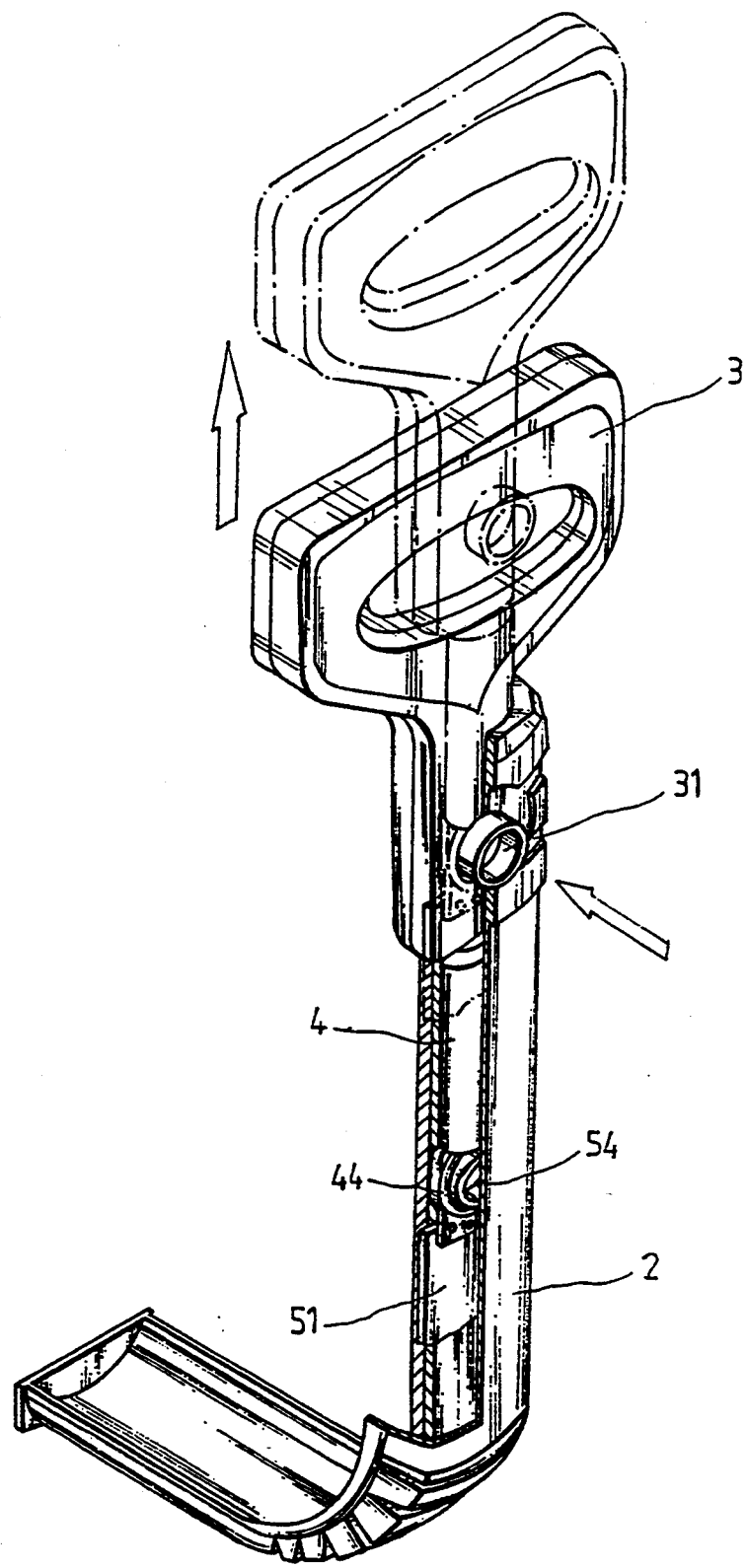
FIG. 3 is an assembly view of the pull arm, handle and extension member of the luggage truck shown in FIG. 1, showing the extension member pulled out of the pull arm.

Referring to FIG. 3 and FIG. 1 again, when the plate 12 is moved forward by the connecting frame 51, the slide 13 is moved forward along the parallel rails 16. Because the sector gears 66 of the movable wheel holders 6 are respectively meshed with the racks 131 of the slide 13, moving the slide 13 forward along the parallel rails 16 causes the movable wheel holders 6 to turn bilaterally outwards and to extend out of the two opposite sides of the base 1. Therefore, the base 1 is stably supported on the ground by the spherical wheels 63 of the movable wheel holders 6 and the spherical wheels 112 of the wheel assemblies 11 when it is pulled by the handle 3. When the movable wheel holders 6 are bilaterally turned outwards and extended out of the two opposite sides of the base 1, the bolt 52 is simultaneously forced into the side hole 22 on the pull arm 2 (see FIG. 2) preventing the connecting frame 51 from moving backwards, and therefore the movable wheel holders 6 are locked in the respectively extended out positions.

Referring to FIG. 4, when the movable wheel holders 6 are bilaterally extended out of the base 1, the base 1 becomes stably supported on the ground by the spherical wheels 63 of the movable wheel holders 6 and the spherical wheels 112 of the wheel assemblies 11. On the contrary, when the bolt 52 is pushed back from the side hole 22 and the extension member 4 is moved back inside the pull arm 2 by the handle 3, the movable wheel holders 6 are turned back into and received inside the base 1 at the bottom. When the handle 3 is moved back inside the pull arm 2, the bolt 31 of the handle 3 is forced into the side hole 22 again to lock the movable wheel holders 6 in the respective received positions.

What is claimed is:

1. A luggage truck comprising:
   a base equipped with wheels in corners thereof at a bottom thereof, having a track longitudinally disposed in a middle thereof, a slide moved back and forth along said track, and a cover, covering said track;
   a pull arm extending upward from one end of said base at a top thereof and covered with a decorative cover board, said pull arm having a top opening at the top thereof and a locating hole at one side near the top;
   a handle extending out of the top opening of said pull arm and having a movable bolt inserted into the locating hole on said pull arm;
   an extension member received inside said pull arm and connected between said handle and said slide;
   two movable wheel holders pivotally mounted on said base at the bottom and bilaterally meshed with said slide to hold a respective wheel at an outer side;
   lock means connected between said extension member and said slide for locking said extension member in an extended-out position outside said top opening of said pull arm; and
   wherein when said extension member is moved to said extended-out position by said handle after the bolt of said handle has been pushed inward from the locating hole on said pull arm, said slide is pulled forwards causing said movable wheel holders to turn bilaterally outward so as to extend out from two opposite sides of said base for supporting said base on the ground.

2. The luggage truck of claim 1 further comprising a cover plate fastened to said base at the top to cover over said movable wheel holders, said cover plate having a plurality of downward mounting rods in corners thereof respectively fitted into respective mounting holes on said base.

3. The luggage truck of claim 1 wherein said slide has two opposite sides fixedly fastened with two racks respectively meshed with a respective sector gear on each movable wheel holder, a front end connected to said lock means, and a rear end connected to a rod at one end of said track by spring means.

4. The luggage truck of claim 1 wherein the handle comprises two symmetrical shells joined together and defining a hand hole, a side hole, a stub rod raised from an inside recessed hole thereof, a bolt, a spring mounted on said stub rod to support said bolt, permitting said bolt to extend out of said side hole and inserted into said locating hole on said pull arm.

5. The luggage truck of claim 1 wherein said extension member comprises a flexible barrel, a first mounting ring fastened to said handle, a second mounting ring fastened to said lock means, and a steel cable connected between said first and second mounting rings.

6. The luggage truck of claim 5 wherein said lock means comprises a socket, a connecting frame connected between said socket and said slide, a bolt connected to said second mounting ring of said extension member and having a front end extending out of said socket, a spring stopped between said bolt and said decorative cover board, the bolt of said lock means being inserted into the locating hole on said pull arm as said extension member is moved to said extended-out position.

7. The luggage truck of claim 1 wherein each movable wheel holder comprises a casing having a wheel hole at one end, a cap mounted on said wheel hole, a spherical wheel revolvably retained in said cap by steel balls and partially extending out of said wheel hole, a cover shell covering said casing over said cap, and a gear fixedly fastened to said casing and meshed with a rack on the slide, said gear having a mounting rod fastened to said base through a screw joint.

* * * * *